Nov. 22, 1955     J. Z. FORIS     2,724,762

SYSTEMS FOR HOT-FORMING OF METAL OBJECTS

Filed June 15, 1953     2 Sheets-Sheet 1

INVENTOR.
Julius Z Foris
BY
P. Stephen Baker
ATTORNEY

Nov. 22, 1955 J. Z. FORIS 2,724,762
SYSTEMS FOR HOT-FORMING OF METAL OBJECTS
Filed June 15, 1953 2 Sheets-Sheet 2
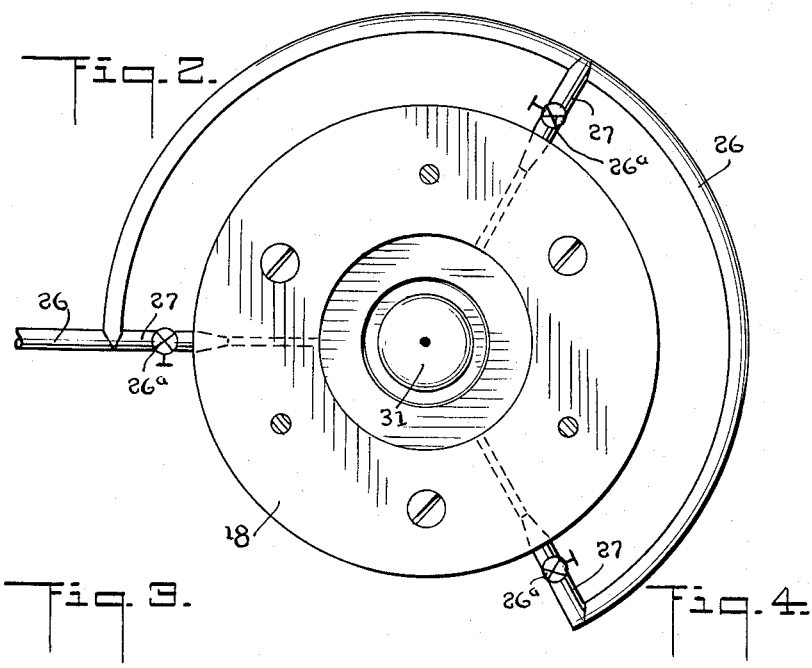
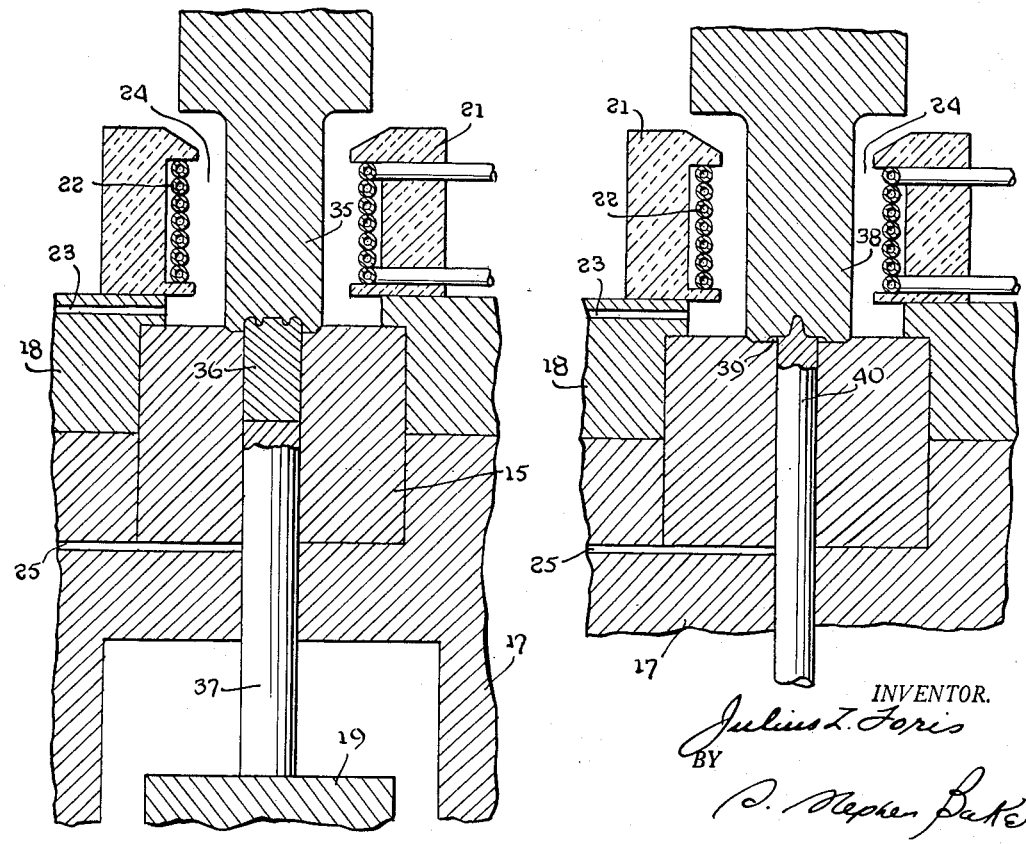
INVENTOR.
Julius Z. Foris
BY
C. Stephen Baker
ATTORNEY

United States Patent Office 2,724,762
Patented Nov. 22, 1955

2,724,762

SYSTEMS FOR HOT-FORMING OF METAL OBJECTS

Julius Z. Foris, Livingston, N. J.

Application June 15, 1953, Serial No. 361,550

2 Claims. (Cl. 219—3)

This invention relates to systems for hot-forming of metal objects.

The invention is particularly described with reference to the production of knock-out pins although, as shown hereinafter, it may be applied to other articles where dimensions are of critical importance. Knock-out pins, sometimes called ejector pins, are commonly used in the die casting and plastic molding industries. In general, they comprise a head and a shaft portion. The pin is used by securing the head to the knock-out plate of a mold.

In order to serve its purposes effectively, the shaft portion of a knock-out pin is heat treated to a desired hardness while the head is annealed. The conventional method of producing such pins is to cut annealed and oversized stock to a desired length, forge the head, heat treat the pin including the head, grind the shaft portion, grind the various surfaces of the head, and finally anneal the head. Special pains must be taken in grinding the corner where the head and shaft portion meet. All these operations are expensive, time consuming and further produce a knock-out pin which is not as efficient as knock-out pins produced by my system which is moreover far more economical.

In my method of producing knock-out pins or similar articles, a desired length of annealed stock is heat treated to produce hardness and then centerless ground to a desired diameter. This ground stock is then hot headed into finished form or near finished form with a minimum of subsequent operations such as machining operations. In this method, the shaft portion remains heat treated while the head becomes annealed. As will be shown hereafter, the head may further be provided with an integral undercut which assures accurate fitting in the ejector plate. Notwithstanding the elimination of machine operations, a knock-out pin produced according to the instant invention is generally accurately and precisely formed as it is taken from the forming apparatus.

The above objects are realized by injecting two streams of an inhibiting gas, such as burning hydrogen, against both the top end and a lower or shaft portion of the heat treated pin which is subjected to a plasticizing heat during hot forming. As a result, the shaft portion remains heat treated while that portion which is heated to a plastic or near plastic state is supplied with the hydrogen from both ends. As a result, scale, oxides or other undesirable surface conditions are inhibited throughout the heated portion and such portion retains its surface characteristics and dimensions throughout. The invention includes specific apparatus for accomplishing the above as will be described hereinafter in connection with the following description and drawings in which:

Figure 2 is a view taken along the line 2—2 of Figure 1;

Figure 3 is a view similar to Figure 1 but illustrating the formation of a die by hot hobbing; and Figure 4 shows an apparatus similar to that of Figure 3 but showing a formation of a core pin by the system of the instant invention.

Figure 1:
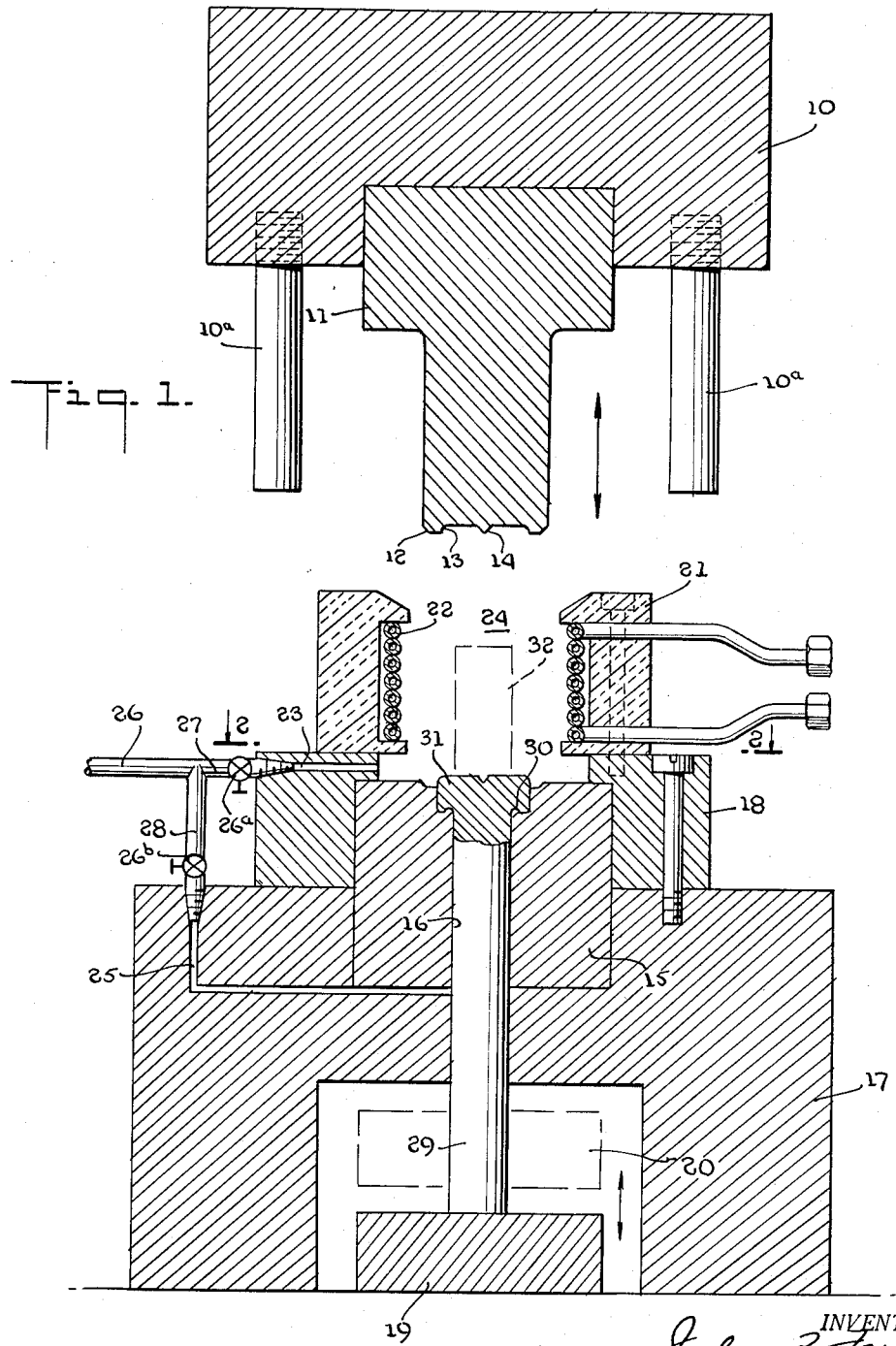
Figure 1 is a vertical, sectional view of an apparatus constructed according to the instant invention.

The apparatus employed in the system of the instant invention comprises a movable punch holder or drop hammer 10 which is actuated by conventional means. For example, it may be either steam or air cylinder operated. The punch 11 is of a metal adapted to retain its hardness at the high temperatures herein and it is shaped to correspond to the die with which it cooperates including the angular engagement edge 12.

The particular punch illustrated is provided with a curvature 13 which forms a radius or chamfer on the head or knock-out pin as will hereinafter be described. In addition, a projection 14 may serve to apply a center detail to such head. The die 15 is shaped to complement the punch and it is provided with a central longitudinal cavity or opening 16 for receiving the knock-out pin and maintaining it in a position to be acted upon by the punch. The die rests on die support 17 as will be recognized, while die retainer 18 secures it thereto. An anvil 19 which also serves as an ejector is disposed in the ejector box 20. In order to stop the punch immediately before it strikes the die to prevent damage to the die, a plurality of spacers 10a are provided. These spacers are adjustable in height as illustrated to produce the desired head thickness on the pin.

Secured to the top surface of the die retainer 18 is an induction heating apparatus comprising a heat resistant, non-metallic induction coil retainer 21. This supports a conventional form of induction coil 22 which is water cooled pursuant to conventional practice and the central opening of which forms a heating chamber. The positioning of the induction heater is such that it not only heats the upper portion of the pin to plasticity but it also receives and pre-heats the punch 11 as well as the die itself so as to avoid thermal shock to these forming components.

Formed in the die retainer 18 is an upper series of conduits or ports 23 which communicate with the heating chamber 24. As noted in Figure 2, in the form illustrated, these ports are three in number and are spaced 120° apart accordingly. A second, lower series of ports 25 are formed in the die support 17 and such ports 25 communicate with the lower end of the die cavity 16. The upper series of ports 23 are on one horizontal plane while the second series of ports 25 extend horizontally in a plane which is from two to three inches lower than the plane of the upper series so as to be about midway of the shaft of the pin being formed. These dimensions are, of course, purely by way of example and not to be construed as either critical or as limitations.

Connected to both series of ports is a supply pipe 26 which branches off into upper arms 27 and lower arms 28. Thus, the supply pipe 26 extends arcuately so as to communicate with and feed both the upper and lower ports. Fed through pipe 26 through the metering valves 26a and 26b so as to permit variation of supply, is flowing hydrogen or other conventional inhibitor such as the inert gases which may be mixed with hydrogen or the like for inhibiting oxidation, scales, corrosion, etc. The hydrogen is under pressure greater than atmosphere and is maintained burning as it emerges from the ports. Thus, it may be manually ignited or will ignite itself through the heat of the pin.

The operation of the invention will first be described in connection with a knock-out pin to be formed from the rod or length or pin 29. The pin 29 is of heat-treated stock as above explained to provide at least surface hardness therein. The knock-out pin produced therefrom is preferably formed with an annular undercut 30 on the underside of the pin head 31. Accordingly, the die 15 is shaped to produce such an undercut. The purpose of such an undercut is to produce a better fit between the underside of the head and the ejector plate of a mold or die, for example. Such an undercut is recognized as being highly desirable and ordinarily must be produced by machining.

In producing a knock-out pin, the punch and die are pre-heated to from 300° to 1000° F. or more as above described. Hydrogen is kept flowing. Although the punch and die is pre-heated by the induction coil 22, it may be observed that the hydrogen burns continuously and the punch and die will be additionally heated thereby during normal operation. In addition, the hot head portion of the pin will serve to maintain the punch and die hot.

The pin 29 is introduced through the induction coil and through the die cavity until it rests on the anvil 19. The height of the anvil in its lowermost or heading position is adjustable, as by employing spacers, until just enough of the top portion of the pin 29 normally protrudes above the die to form the head 31 when the punch and die are brought together. The anvil 19 is then elevated about an inch so that the pin occupies a position illustrated by the broken lines 32 and wherein its uppermost portion is brought into the heating chamber of the induction coil. The induction coil is then turned on and in a matter of seconds, the portion of the pin within the coil becomes cherry-red bright or yellow hot. No scale will form because of the action of the burning hydrogen. The punch is then brought down through the coil, deforming the heated and plasticized portion of the pin, until it meets the die. In this final heading position, the pin, anvil and punch are in their lowermost positions. The punch is then rapidly moved to its uppermost position and the anvil is again raised, thus raising the head and pin upward from the die sufficiently to allow tongs to grasp and remove the pin from the coil and die. A complete cycle may be so rapid that the pin head is still red hot when removed and is thus annealed. During the entire cycle the upper and lower streams of hydrogen burn continuously.

It will be noted that the die opening 16 is of such a width or diameter that it receives the pin 29 snugly with only a slight clearance. Clearance actually will be variable depending upon the heat of the pin, such clearance becoming slightly greater as the pin shaft cools. However, notwithstanding the extent of any such clearance, the burning hydrogen will fill the space so as to prevent oxidation or corrosion. If there is no clearance, this danger is not present but to the extent that it is, the hydrogen will effect its inhibiting action. It will be observed that the lower stream of hydrogen, being directed to the lower end of the die opening, and being lighter than air, is directed upwardly through the die opening so as to act upon the shaft of the pin in the die opening and against the undersides of the pin head when it is formed. This action helps to produce an accurately formed undercut. On the other hand, the upper stream of hydrogen is applied directly into the heating chamber of the induction coil. The width of the heating chamber is greater than that of the die opening 16 so that the pin is considerably spaced from the inner walls of the heating chamber and from the coil 22 which is disposed adjacent those walls. In addition, the width or diameter of the striking face of punch 11 is less than that of the heating chamber so that the punch travels freely therethrough in the forming operation.

In a knock-out pin formed pursuant to the above mentioned system, the pin shaft will remain heat treated and little or no machining will be necessary in respect to either the shaft or the head including the undercut 30. If desired, the punch and die may be operated cooler than above mentioned and the pin head will not anneal as much and considerable hardness will be retained by such head. On the other hand, if additional annealing is desired, the upward motion of the anvil is interrupted while the head is in the coil and the coil is turned on momentarily. During this time, the hydrogen will be maintained burning.

The undercut 30 when formed pursuant to the instant invention, is superior to a machined undercut because the grain follows the contours of the pin and provides maximum strength. In addition, it may be observed that heat treating the pins prior to heading is important in that it discourages spreading out of the lower portion of the pin which contacts the anvil during the heading operation. It will be recognized that any such spreading or mushrooming would interfere with ejecting the pin through the die. The heat treating of the pin is further of benefit in preventing bending of the pin during the heading operation.

In Figure 3 is illustrated a hot hobbing operation where the hob or punch 35 forms a die 36. Die 36 is supported on a rod 37 which, as explained in connection with the previous embodiment, may serve to bring the die 36 into the heating chamber 24 and thereafter lowering it as above described for producing a finished die. Die 36 may comprise a conventional type of die which may form articles such as buttons or the like. The streams of hydrogen gas will be applied through the ports 23 and 25 as in the previous embodiment.

In the embodiment of Figure 4, the same method is employed to produce a core pin or the like. Such core pins are generally used to mold holes, depressions or other details through plastics and die castings. The hob 38 may incorporate any details such as splines or serrations or could have hexagonal or square cavities. It will be noted that the hob is formed with an annular space provision 39 so as to provide an outlet for excess mushrooming material or flash which is subsequently ground away.

In producing the core pin 40 or die 36, the hydrogen applied from both ends of the formed article will produce an article which is substantially free of any scale or corrosion so that it likewise may be taken from the forming machine and employed in its final environment with little or no machining.

What is claimed is:

1. An apparatus for hot-forming objects comprising a punch adapted to strike and shape the upper portion of an elongated pin, a die having a central, vertical opening formed therethrough for receiving said elongated pin, means to elevate and maintain the top portion of said pin above said die and die opening and wherein said top portion may be acted upon by said punch, an induction heating coil having a central opening disposed wholly above said die and so that said pin top portion may be disposed in said induction coil central opening by said elevating means and means to direct a first stream of burning oxide inhibiting gas against said pin top portion and a second stream of said gas against the shaft of said pin and at the underside of said die opening, the width of said die opening being less than that of said induction coil central opening, said die opening width being adapted to snugly receive said elongated pin while said pin top portion is spaced from the inner walls of said induction coil central opening.

2. An apparatus for hot-forming objects comprising a vertically movable punch adapted to strike and shape the upper portion of an elongated pin, a die having a central, vertical opening formed therethrough for receiving said elongated pin, an anvil for supporting said elongated pin and for elevating and maintaining the top portion of said pin above said die and die opening and wherein said top portion may be acted upon by said punch, an induction heating coil having a central opening disposed wholly above said die and communicating with said die opening so that said pin top portion may be disposed in said induction coil central opening by said anvil, and means to direct a first stream of oxide inhibiting gas at one horizontal level against said pin top portion, and a second stream of said gas at a lower horizontal level than said first stream and against the shaft of said pin and at the underside of said die opening whereby said second stream of said gas may travel upwardly through said die opening, the diameter of said die opening being less than that of said induction coil central opening, said die opening diameter being adapted to snugly receive said elongated pin while said pin top portion is spaced from the inner walls of said induction coil central opening, said punch being of a diameter which is less than the diameter of said induction coil central opening so that it may travel freely therethrough without contacting the inner walls thereof.

References Cited in the file of this patent

UNITED STATES PATENTS

| | | |
|---|---|---|
| 432,651 | Thompson | July 22, 1890 |
| 2,365,857 | Benes | Dec. 26, 1944 |
| 2,598,016 | Richardson | May 27, 1952 |

FOREIGN PATENTS

| | | |
|---|---|---|
| 555,025 | Great Britain | July 29, 1943 |